(12) United States Patent
Gelada Camps et al.

(10) Patent No.: US 10,488,245 B2
(45) Date of Patent: Nov. 26, 2019

(54) METHOD AND A SYSTEM FOR ASSESSING THE AMOUNT OF CONTENT STORED WITHIN A CONTAINER

(71) Applicant: UBIKWA SYSTEMS, SLU

(72) Inventors: Jaume Gelada Camps, Girona (ES); Esteve Farres Berenguer, Girona (ES); David Raba Sanchez, Girona (ES); Marc-Arnold Haupt Giro, Girona (ES); Salvador Gurt Pla, Girona (ES)

( * ) Notice: Subject to any disclaimer, the term of this patent is extended or adjusted under 35 U.S.C. 154(b) by 0 days.

(21) Appl. No.: 16/077,473

(22) PCT Filed: Feb. 13, 2017

(86) PCT No.: PCT/IB2017/000104
§ 371 (c)(1),
(2) Date: Aug. 11, 2018

(87) PCT Pub. No.: WO2017/137832
PCT Pub. Date: Aug. 17, 2017

(65) Prior Publication Data
US 2019/0056258 A1   Feb. 21, 2019

(30) Foreign Application Priority Data
Feb. 11, 2016   (EP) .................................... 16000340

(51) Int. Cl.
*G01C 3/08*   (2006.01)
*G01F 23/292*   (2006.01)
*G01S 17/89*   (2006.01)

(52) U.S. Cl.
CPC ........ *G01F 23/292* (2013.01); *G01F 23/2928* (2013.01); *G01S 17/89* (2013.01)

(58) Field of Classification Search
CPC ..... G01F 23/292; G01F 23/2928; G01S 17/89
(Continued)

(56) References Cited

U.S. PATENT DOCUMENTS

| 6,986,294 B2 | 1/2006 | Fromme et al. |
| 7,515,095 B2 | 4/2009 | Wilkie et al. |

(Continued)

FOREIGN PATENT DOCUMENTS

| DE | 4339441 A1 | 5/1995 |
| EP | 2708859 A1 | 3/2014 |

(Continued)

OTHER PUBLICATIONS

3D Level Scanner Multi-Scanner System Manual. XP055369920 Brochure.

*Primary Examiner* — Mark Hellner
(74) *Attorney, Agent, or Firm* — Eugenio J. Torres-Oyola; Victor M. Rodriguez-Reyes; Ferraiuoli LLC (57) ABSTRACT

The method comprising attaching a 3D sensor (20) on a top part of the container (10) in a position (P) and with an orientation (O) such that its field of view (FOV) is oriented towards the content (11) stored in the container (10); acquiring, by the 3D sensor (20), a depth map (DM); and computing, by a computing unit, a 3D surface model by processing said acquired depth map (DM) and using said given position (P), orientation (O) and field of view (FOV), and a 3D level model by removing from the computed 3D surface model the points corresponding to the interior walls of the container (10), using a 3D function that searches the intersection or matching between the 3D surface model and the shape of the container (S), and filling in the missing points corresponding to the content (11) that falls out of the field of view (FOV) of the 3D sensor (20).

20 Claims, 5 Drawing Sheets

(58) Field of Classification Search
USPC .......................................................... 356/5.01
See application file for complete search history.

(56) References Cited

U.S. PATENT DOCUMENTS

| | | | |
|---|---|---|---|
| 8,159,660 B2* | 4/2012 | Mimeault | G01F 23/292 |
| | | | 356/139.01 |
| 8,820,182 B2 | 9/2014 | Nikolay Nikolov et al. | |
| 10,337,903 B2* | 7/2019 | Welle | G01F 23/284 |
| 2005/0080567 A1 | 4/2005 | Wieting | |
| 2007/0040677 A1 | 2/2007 | Blair, Jr. | |
| 2010/0101317 A1 | 4/2010 | Ashrafzadeh et al. | |
| 2012/0281096 A1 | 11/2012 | Gellaboina et al. | |

FOREIGN PATENT DOCUMENTS

| | | |
|---|---|---|
| WO | 2008024910 A2 | 2/2008 |
| WO | 2009121181 A1 | 10/2009 |

* cited by examiner

METHOD AND A SYSTEM FOR ASSESSING THE AMOUNT OF CONTENT STORED WITHIN A CONTAINER

TECHNICAL FIELD

The present invention is directed, in general, to measurement methods and systems. In particular, the invention relates to a method and to a system for assessing the amount of any content, preferably bulk solids, stored within a container, for example a farm silo, a bin or a tank, by means of non-contact measurements.

BACKGROUND OF THE INVENTION

In many industrial environments, bulk solid products are stored and/or processed in silos, tanks or bins. Examples include grain and compound feed silos, and tanks used in the batch processing of foods, pharmaceuticals, sand or minerals. In these industries, one must be able to reliably determine the amount of content stored within a container at any given moment to provide an adequate supply and monitor the in/out flow of content. This determination may be made visually. However, in many instances, the container prevents any sort of visual determination of the present level of the contents. For example, many silos are composed of steel and/or concrete or other nontransparent materials and, therefore, any visual inspection of the content level of such containers would involve manually opening an aperture, which may pose hazards to personnel, and raise the potential of contamination of the contents. Furthermore, visual inspection of content levels lacks accuracy, is time consuming and prevents the automatization of processes. In order to avoid these problems, there are different types of devices and methods that are commonly used to measure the amount of content present in a container.

One method is to determine the mass of the content using load cells or strain gauges installed in the container's support structure, subtracting to the measured mass the known mass of the empty container. Although this method is quite accurate it is not suitable in many occasions due to the high cost of the sensors used, the requirement of a support structure in the silo, the difficulty of the installation and the need of emptying the container to calibrate the system.

An alternative to the previous method is to determine the level of the content using level sensing gauges installed on a top part of the container, subtracting to the known container's height the measured distance between the sensor and one point of the surface of the content. The level measurement can be done by contact means (cable, guided wave radar, etc.) or by non-contact means (ultrasound, radar, laser, etc.). The advantage of these systems is their lower cost, compared with load cells, and that they are easier to install and calibrate. The main problem is a lack of accuracy when they are used in containers with bulk solids, with measurement errors equivalent up to 15-20% of the total container's capacity, due to the uneven surface of this types of contents.

To mitigate the lack of accuracy of level sensors when used in containers with bulk solids, there are several known methods. One is to install several level sensors in the same container and calculate the level as the mean of the levels measured in different points. It has been also disclosed the possibility of using a single non-contact level sensor capable of measuring several points, by means of an actionable gimbal mechanism or any other alternative, and proceed as in the previous case calculating the level as the mean of the levels measured in different points. Although these methods provide better accuracy, they are far from the accuracy provided by load cells and are unable to measure the exact amount of the content stored in the container or detect small variations in the distribution of the content. Furthermore, the installation and calibration process of these systems are quite more difficult than single-level systems, because the multi-point sensor or set of sensors must be precisely oriented in a way that the obtained measures represent a good sample of the content throughout all the level range. The system must also be calibrated in some way that can be discarded the points that correspond to the container interior walls, which is an important issue when the observed area is broad and in irregular containers.

It is also known the method of calculating the volume of the container's content using the given type and dimensions of the container and the measure of the level obtained by the sensor. Additionally, it can be obtained the mass of the content using the calculated volume and a given density of the content. Although these methods work, they are dependent of the accuracy of the measured level, of the given parameters of the container's dimensions and of the homogeneity of the density.

Some patents or patents applications are already known in the field for measuring the amount of content in containers.

U.S. Pat. No. 7,515,095 B2 discloses an antenna for a level sensing gauge that comprises an environmentally sealed chamber extending from the level sensing gauge and mounting and positionable within the interior of a storage container, including a breathable aperture for permitting pressure and humidity equalization between the interior of said chamber and an exterior environment. According to this patent, the sensing gauge is a radar sensing gauge which is mounted to the exterior wall of the storage container by a mounting and antenna system based on microwave technology.

US-A1-2007040677 relates to a cargo detection unit that detects the status of cargo and loading activity within a container. The device transmits microwave radio frequency energy pulses and detects reflections from cargo. Similar to the operation of a radar, the reflected pulses are then analyzed to determine (a) the presence of cargo, such as by comparing the reflected pulses against stored empty containers signature signals and/or (b) detecting a Doppler effect, as caused by loading and/or unloading cargo from the container. The device may use standard radar signal processing techniques, i.e., a digital signal processor, to generate and analyze the reflected pulses cargo status. Activity reports can be forwarded to a cargo tracking unit such as one that uses a wireless mobile telephone communication network to report cargo status to a central location.

U.S. Pat. No. 6,986,294 B2 discloses bulk material measurement packages including an automated instrument package (AIP) system comprised of different sensors suited to be mounted on the inside ceiling of a large silo. In this patent, a laser rangefinder (TOF or phased-based) which sends out pulses of infrared or visible light to obtain reflections off a desired surface may be used. The AIP system of sensors is designed for the on-site user as well as the needs of other parties remotely located from the storage site US-A1-2005080567 discloses a grain bin monitoring system for efficiently monitoring remote grain bins. The grain bin monitoring system includes a main station, a central unit in communication with the main station, a plurality of transmitter units in communication with the central unit, and at least one sensor positionable within a grain bin for determining condition data with respect to a grain bin. The sensor is in communication with one of the transmitter units for providing the condition data to the transmitter unit, wherein the transmitter unit automatically forwards the condition data to a central unit that automatically forwards the condition data to the main station. In the event of an alarm condition, an individual may be notified.

U.S. Pat. No. 8,820,182 B2 relates to the remote monitoring of the floating roofs of large storage tanks, including tanks used for storing liquid petroleum products or other chemicals. The invention comprises one or more intelligent sensor units and one or more communication units. The sensor unit integrates multiple sensors into a self-contained unit that can be completely encapsulated for use in harsh environments. Additionally, the unit may have a magnetic base for rapid installation on steel tank roofs. The communication unit communicates with the sensor units and with an external monitoring system. The communication unit can be used to relay information from the sensor units to or from a monitoring system and may contain a microprocessor for sensor fusion or for computing alarm conditions. The sensor unit can incorporate batteries and/or solar cells for as a power source, and communicates with the communication unit using a wireless communications link.

WO-A1-2009121181 discloses a method and system for determining a level of a substance in a container, the method comprises emitting one pulse from a light source in a field of illumination toward a surface of said substance in said container. A backscatter signal of said pulse is detected by an optical detector. A lidar trace is created from said backscatter signal, said lidar trace including at least one reflection peak; A surface reflection is identified among said at least one reflection peak in said lidar trace, said surface reflection being a reflection of said pulse from said surface. The surface reflection is signal-fitted to provide a fitted surface trace. A level of said substance is determined in said container using said fitted surface trace. Only the level of the substance is computed.

EP-A1-2708859 discloses a system for determining volume of material in a tank and method for measuring the quantity of material in a tank such as a commodity air cart of an air seeder in which a sensor or sensors are used to measure the distance to the surface of the material. The distance data is then used to determine a surface profile of the material from which the volume of material is calculated. The volume is converted to weight using known material density information.

In view of the above background, there is a need for a new method and system that provides higher accuracy than previous multi-level measuring methods, reaching accuracies similar to load cells, and avoiding the calibration complexities allowing the installation in any container type by non-skilled people. The invention makes uses of high-resolution and wide field-of-view 3D cameras to acquire a depth map of the area observed and it makes use of 3D processing algorithms to calculate an accurate representation of the surface of the content within the container. It also provides several alternatives to automatically obtain or adjust some critical parameters used by the 3D processing algorithms.

DESCRIPTION OF THE INVENTION

To that end, embodiments of the present invention provide according to a first aspect a method for assessing the amount of content stored within a container such as a farm silo having a given shape defined by a 3D model on a given reference system and storing a given amount of content (e.g. livestock food). The method comprises attaching, on a top part of the container, a 3D sensor, said 3D sensor being arranged in a position and with an orientation such that the field of view of the 3D sensor is oriented towards said content; acquiring, by the 3D sensor, a depth map of a given resolution (including the whole or a portion of a surface of the content, and that may also include the whole or a portion of the interior walls of the said container); and computing, by a computing unit operatively connected to the 3D sensor, a 3D surface model representing the surface of the observed area on the given reference system, and a 3D level model representing the top surface of the content.

According to the proposed method, the 3D surface model is computed based on the given reference system by processing said acquired depth map and using the given position, orientation and field of view of the 3D sensor. The 3D level model is computed by removing from the computed 3D surface model the points corresponding to the interior walls of the container, preferably using a 3D function that searches the intersection or matching points between the 3D surface model and the 3D shape model of the container, and filling in the missing points corresponding to the content falling out of the field of view of the 3D sensor.

Besides, the proposed method may further compute different representations indicative of the content using the computed 3D level model and the 3D shape model of the container. For instance a liquid level model can be computed providing a scalar value representing the equivalent level if the surface of the content adopted a horizontal plane shape. Moreover, a 3D content model, i.e. a 3D representation of the shape adopted by the content inside the container, as well as a scalar value representing the equivalent volume, can be also computed.

According to an embodiment, the mass corresponding to the container's content is computed using the calculated content volume and a given density of the content. Alternatively, the density corresponding to the content can be computed using the calculated content volume and a given mass of said content. The computed mass or the computed density can be automatically adjusted each time an increment in volume of the content is detected as the pondered mean of given densities or as a pondered mean of given mass of the different contents stored in the container.

According to an embodiment, the 3D level model is further computed using differences in reflectivity or color, depending of the capabilities of the 3D sensor, to differentiate the content from the interior walls of the container. This information can be used by the 3D level function for increased accuracy and accelerate the process.

According to an embodiment, the 3D model of the container's shape is obtained by a parametric function that uses a given type of container with dimensions defining his size and proportions. The 3D model of the container's shape may be automatically adjusted, according to an embodiment, by using one or more 3D surface models (computed at different periods of time) and said 3D shape fitting function.

During the attachment of the 3D sensor to the top part of the container one, two or three of the coordinates of the position of the 3D sensor can be prefixed using some reference points of the container. Moreover, one, two or three of the angles of the orientation of the 3D sensor can be also prefixed using visible marks on the 3D sensor and pointing the marks to some reference points of the container. Said angles of the orientation of the 3D sensor may also be obtained via a sensor attached to the 3D sensor such as an inclinometer, an accelerometer, a gyroscope, a magnetometer or even combinations thereof such as an inertial measurement unit (IMU).

Small errors in the given position and orientation parameters of the 3D sensor may have great impact in accuracy. These parameters should be obtained after installation but are not easy to measure by non-skilled people or in some type of containers. Therefore, in the proposed method, according to an embodiment, the position and orientation of the 3D sensor are automatically obtained or adjusted by the 3D shape fitting function that fits the 3D surface model to the 3D shape model of the container.

The proposed method may also detect adherences stacked to the interior walls of the container. This can be done, in an embodiment, by computing different 3D surface models obtained at different periods of time and using one or more of said 3D surface models and the 3D shape model of the container. Alternatively, differences in reflectivity or color to differentiate the content from the interior walls of the container can be used.

In case the container is too big that a single 3D sensor is not enough for allowing the measurements (for example when the 3D sensor's field of view does not cover the whole surface of the content), two (or more) 3D sensors can be used by the proposed method. According to an embodiment, the proposed method comprises attaching, on the top part of the container, two (or more) 3D sensors, each one being arranged in a position and with an orientation such that its field of view is oriented towards the content in a way that the total observed area is greater than the area observed individually by each 3D sensor, and acquiring, by each 3D sensor, a depth map of a given resolution. Then, the computing unit, which is operatively connected to each 3D sensor, computes:
- a set of partial 3D surface models based, all of them, on the given reference system by processing the acquired depth maps and using the position, orientation and field of view of each 3D sensor;
- a 3D surface model based on said set of partial 3D surface models using a 3D union and matching function that joints the non-coincident points and match the coincident points; and
- a 3D level model by removing from the computed 3D surface model the points corresponding to the interior walls of the container, using a 3D function that searches the intersection or matching between the 3D surface model and the shape of the container, and filling in the missing points corresponding to the content falling out of the field of view of the 3D sensors.

Embodiments of the present invention also provide according to a second aspect a system for assessing the amount of content stored within a container. The system includes a device (it could include more than one) which comprises a 3D sensor such as a time-of-flight (TOF) sensor, among others, for instance a LIDAR sensor or a stereovision sensor, and a computing unit (it could be more than one too) with one or more processors operatively connected to the 3D sensor, either via a wired or a wireless connection, configured to implement the method of the first aspect of the invention. The system, in case the container being of big dimensions that a single 3D sensor is not enough for allowing the measurements can include more than one 3D sensor. Preferably, each device will only comprise one 3D sensor. However, it is also possible to have two (or more) 3D sensors comprised in a single device.

In accordance with an embodiment, the attachment of the 3D sensor to the container includes pivoting means for a gravity auto-alignment of the 3D sensor (either passive, i.e. without intervention of other devices/mechanisms, or active, for example by means of an engine or similar mechanism), so that the field of view of the 3D sensor, opposite to said pivoting means, is facing a vertical direction towards the inside of the container. Alternatively, the attachment includes pivoting means with a fixation mechanism so that the field of view of the 3D sensor can be oriented and fixed towards the content.

In accordance with another embodiment, the device includes a one, two, or three axis measuring sensor such as an inclinometer, an accelerometer, an IMU, etc. configured to provide accurate information about the orientation of the 3D sensor.

Preferably, the 3D sensor is attached to the top part of the container by fixation means including, but not limited to, a ring-shaped member externally attachable (i.e. which can be mounted from the outside of the container). The device may include one or more batteries for its power supply. Optionally, the device may further include an energy harvesting device, including a photovoltaic panel incorporated in a slopped support plane attached- to said ring-shaped member, and/or a thermoelectric generator that leverages a temperature differential between the interior of the container and the outside.

In accordance with another embodiment, the device further includes a set of sensors that can detect storage conditions of the container. Besides, other sensors may be also included to detect different physical and/or biological conditions of the content stored within the container. For example, but not limited to, the included sensors may detect temperature, pressure, moisture, luminosity, vibrations, sound level, gas compound concentration, and volatile organic compounds, including $CO_2$ and/or $NH_3$, generated by bacteria and/or fungi, etc.

In accordance with another embodiment, the 3D sensor includes an enclosure having means for dust, condensation, microbial, and/or insects immunity using passive methods, including anti-static, hydrophobic, anti-microbial, insect-repellent materials or coatings, and/or active methods, including vibration at a frequency or pattern of frequencies, windscreen wipers or heating.

The device in accordance with some embodiments may further include a presence detector (e.g. a magnetic detector) adapted to detect the presence of an element placed in the fixation means, the presence detector operating to activate or deactivate the battery (or batteries) of the device depending on said presence detection.

In accordance with yet another embodiment, the 3D sensor is an optical sensor and includes an optical auto-zoom to modify either automatically or manually the field of view of the 3D sensor in order to adapt to a current content level of the container. According to the proposed invention the optical auto-zoom is connected to the computing unit(s).

The device of the proposed system preferably further includes one or more communication modules configured to communicate with a cloud service or with a mobile/computer application via a wireless communication network, public or non-public or combination of both, including a combination of a non-public mesh network between the measurement systems and a public mobile/IoT network through a standalone or integrated gateway/edge-router, by means of proprietary or standard Internet communication protocols.

Other embodiments of the invention that are disclosed herein, and that would be detailed below, include also a device which is used in the proposed system and method for assessing the amount of content stored within a container.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Figure 1:
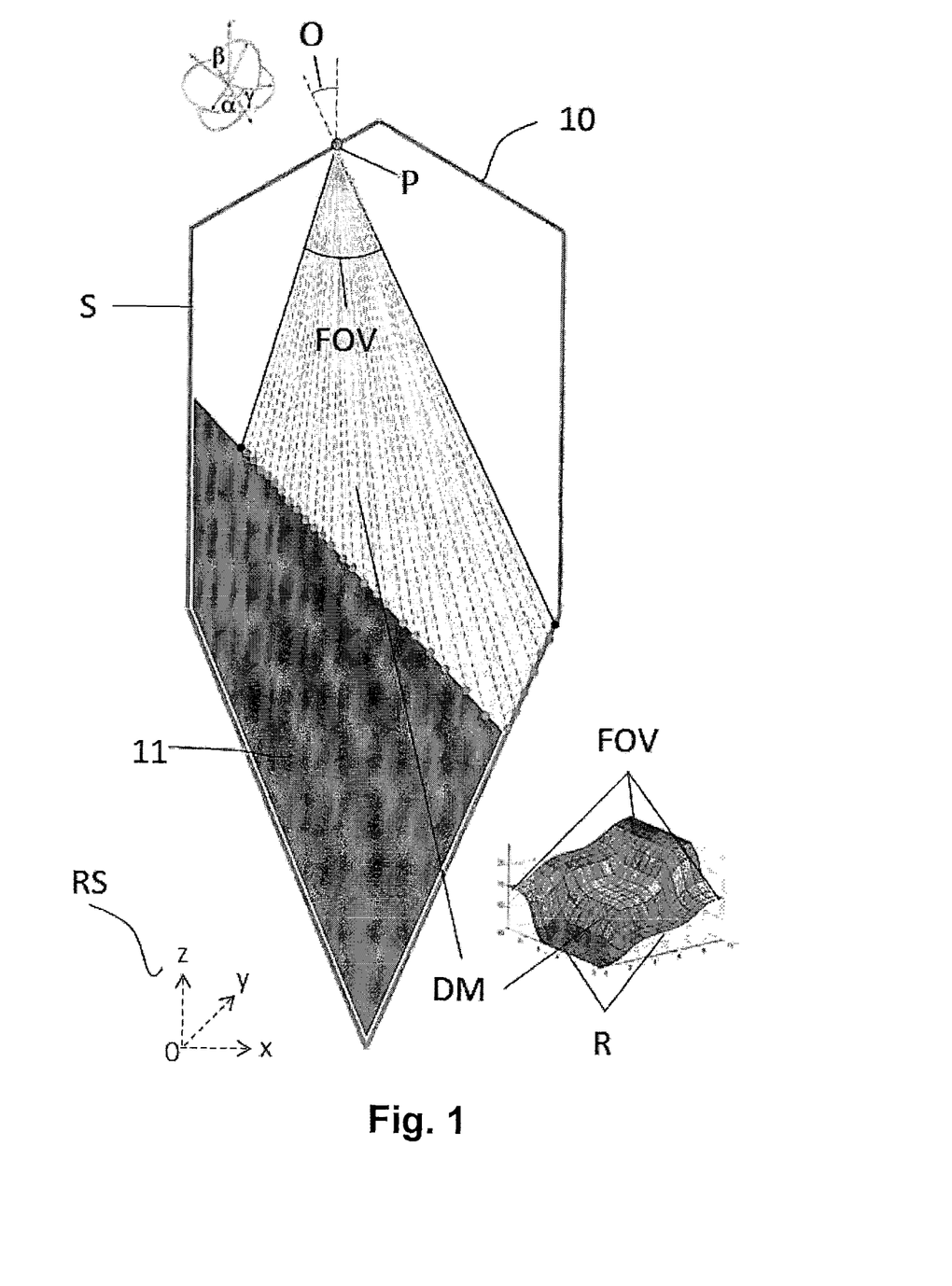
FIG. 1 is a schematic illustration of a device mounted on the top part of a container to be used by the present invention to assess the amount of content stored within the container.

FIG. 1 illustrates a typical container 10, such as a farm silo, among others, having a given shape S defined by a 3D model on a given reference system RS and used to store content 11, e.g. bulk solid, powder, flour, liquid, etc. the amount of which has to be assessed by the present invention. According to said figure, a 3D sensor 20 (see FIGS. 2 and/or 3) is attached to a top part wall of the container 10 in a position P (the (x,y,z) coordinates of the location of the 3D sensor 20) and with an orientation O (the angles ($\alpha$, $\beta$, $\gamma$) that define where the 3D sensor 20 is pointing to) such that a field of view FOV of the 3D sensor 20 (the two-dimensional angles that define the space observed by the 3D sensor 20) is oriented towards the content 11.

The 3D sensor 20 may be any kind of 3D sensor able to acquire a depth map DM, i.e. a two-dimensional matrix with the distances from position P to all the points observed by the sensor. Preferably, the 3D sensor 20 is a time-of-flight (TOF) sensor; however LIDAR or stereovision sensors, among others, are also possible. The 3D sensor 20 is configured to acquire said depth map DM with a given resolution R (i.e. the number of points the sensor can measure in each of the two-dimensions of the field of view FOV). The depth map DM includes the whole or a portion of a surface of the content 11, and may also include the whole or a portion of the interior walls of the container 10.

The 3D sensor 20 may be mounted at the center of the container 10 or at a side thereof, as the embodiment illustrated in the figure.

The depth map, i.e. 3D measurements, are preferably performed while the 3D sensor 20 remains in a fixed position, i.e. the 3D sensor 20 does not move, avoiding in this way the sweep thereof and therefore reducing the energy consumed by the sensor. The field of view FOV, which depends of the lens focal in the case of optical sensors, is selected according with the shape S of the container 10 in order to maximize the footprint measurement. The 3D measurement, preferably, does not require of mechanical mechanism to explore the content surface.

Figure 2:
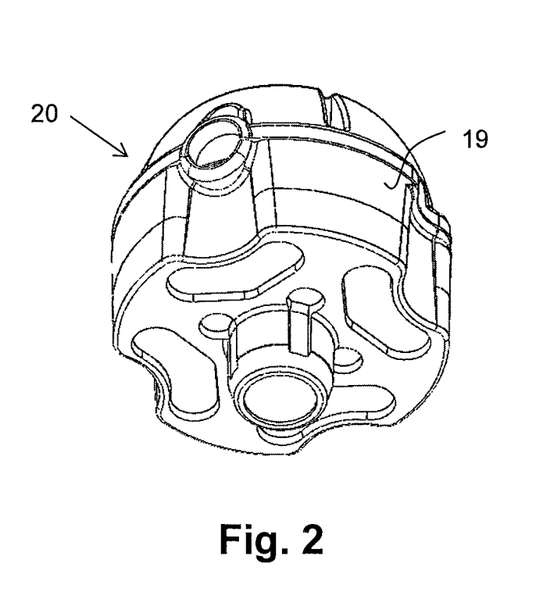
FIG. 2 illustrates a first embodiment of a device used by the present invention to assess the amount of content stored within the container.
Figure 3:
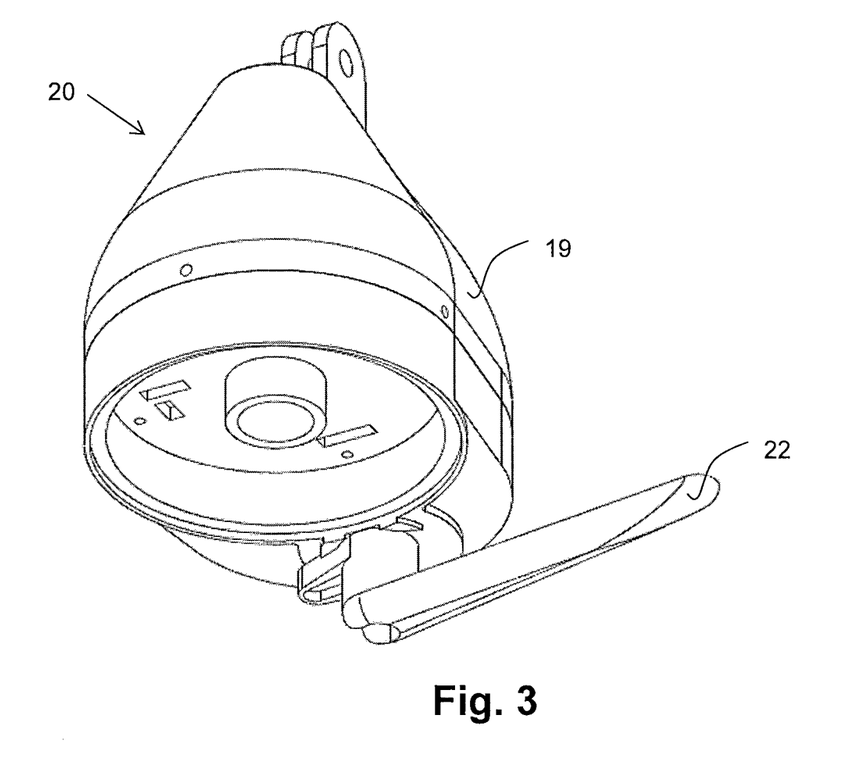
FIG. 3 illustrates a second embodiment of a device used by the present invention to assess the amount of content stored within the container.

According to FIGS. 2 and 3, therein are illustrated two embodiments of the 3D sensor 20 to be used by the present invention to assess the amount of content stored within the container 10. According to these figures, the 3D sensor 20 is enclosed within an enclosure 19 which can be of different materials and of different shapes, as may be seen from FIGS. 2 and 3. The enclosure 19 may comprise means for dust, condensation, microbial, and/or insects' immunity using passive methods such as anti-static, hydrophobic, anti-microbial, insect-repellent materials or coatings, and/or active methods such as vibration means working at a frequency or pattern of frequencies, windscreen wipers or heating. According to the embodiment of FIG. 3, the enclosure 19 includes a windscreen wiper 22.

The 3D sensor 20 may also include pivoting means (not illustrated). According to an embodiment, the pivoting means include a fixation mechanism so that the field of view FOV of the 3D sensor 20 can be oriented and fixed towards the content 11 of the container 10. Alternatively, the pivoting means can be of mechanical type such as a ball or cardan joint, that maintain the 3D sensor 20 aligned with the vertical axis of the container 10. The mechanical pivoting means allow the 3D sensor 20 pivoting between two axes by means of gravity. In addition, the 3D sensor 20 may include a one, two or three axis measuring sensor such as an inclinometer, an accelerometer, a gyroscope, a magnetometer or even combinations thereof (not illustrated) that provides accurate information about the orientation O of the 3D sensor 20.

Moreover, the 3D sensor 20 requires a short transmission wave that reduces the power budget of the device 1 allowing the possibility of working as an unplugged power grid device. In addition, the 3D sensor 20 provides immunity to vibration and noise interferences allowing the deployment in containers without especial installation.

Figure 4:
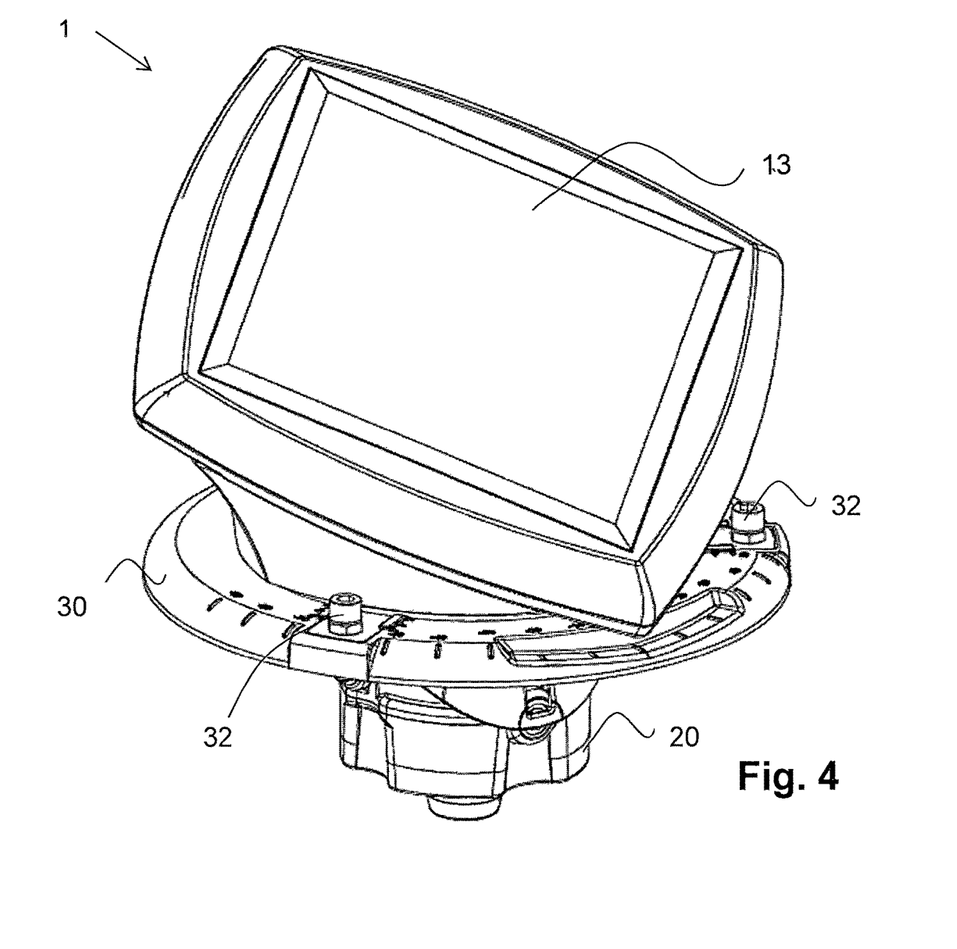
FIG. 4 is a perspective view of the device with an attached photovoltaic panel according to an embodiment of the present invention.

Referring now to FIG. 4, therein it is shown a frontal view of an embodiment of the device 1 that can be fixed on the top part of the container 10. As can be seen in the figure, the device 1 includes the 3D sensor 20 at its bottom. Also, the device 1 includes fixation means, performing, both fixation of the device 1 to the container 10 and also isolation of the interior atmosphere of the container 10. According to this embodiment, the fixation means are formed by a ring-shaped member 30 (not limitative as other different configurations of fixation means are also possible without departing from the scope of protection of the present invention). A photovoltaic panel 13 fixed to the ring-shaped member 30 is in this case also provided for the power supply of a battery/batteries of the device 1.

The photovoltaic panel 13 allows its easy orientation in different latitudes. When fixing/mounting the device 1 to the container 10 the photovoltaic panel 13 is positioned to receive the maximum amount of solar radiation at the minimum insolation. For cost/benefit reasons photovoltaic panel 13 is installed at a fixed angle, instead of following the sun's movement in the sky. However, alternatives embodiments of the invention will also permit an auto movement of the photovoltaic panel 13 in accordance with the movement of the sun. For instance by beans of an automatic solar tracker with a single or a dual axis. Therefore, at any time during daylight the device 1 could be powered.

The optimum installation angle of the photovoltaic panel 13 is estimated by an algorithm (or software program) using the tilt angle of the container 10 and the latitude of each location. The solar panel software evaluates the contribution of the direct solar beam energy but also includes sky diffuse, horizon diffuse and ground diffuse energy that in some circumstance can provide more energy that the direct solar beam.

Figure 5:
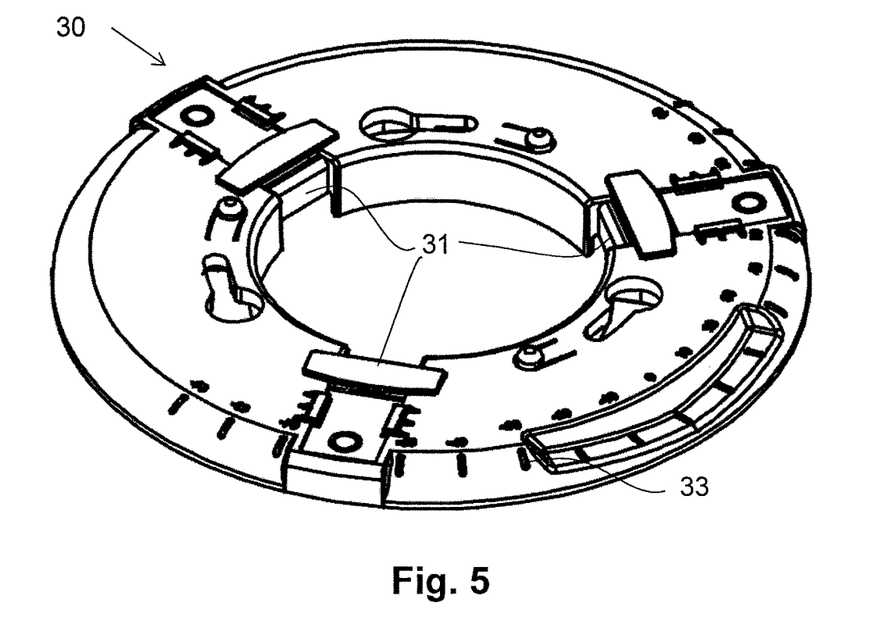
FIG. 5 is a view of the ring-shaped member of FIG. 4 used for fixing the device to the top part of the container.
Figure 6:
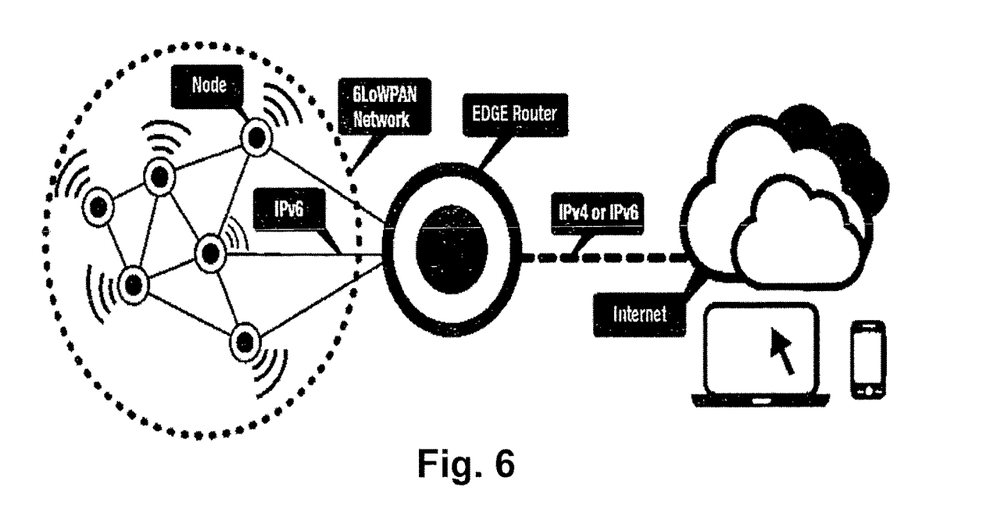
FIG. 6 is an example of a wireless network mesh topology used to communicate the proposed system with other systems according to an embodiment of the present invention.

Referring now to FIG. 5, therein it is illustrated a preferred embodiment of the ring-shaped member 30. The photovoltaic panel enclosure is fit inside the hold of the ring-shaped member 30 and it is locked via a plurality of displacement elements 31 that compress the fixation ring with the container top part wall. A set of screws 32 (as illustrated in the embodiment of FIG. 4) may be also used to increase the locking pressure of the device 1 with the container 10. The ring-shaped member 30 may also include a tilt angle indicator 33 that allows the correct orientation of the device 1 according with solar panel software. In addition, foam may be also placed under the ring-shaped member 30 avoiding water penetration inside the container 10.

According to an embodiment, the device 1 also includes an automatic presence detector that disconnects the device 1 (i.e. the battery or batteries thereof) when is not locked to the container 10 (i.e. when the displacement elements 31 is not placed in the ring-shaped member 30 closing it). This feature avoids battery discharge during transport and storage. Preferably, the presence detector comprises a magnetic detector. The device 1 may also include a thermoelectric generator that leverages the temperature differential between the interior of the container and the outside.

Other embodiments of the device 1 may further include different sensors to detect different storage conditions of the container 10, or even different physical and/or biological conditions of the content stored within the container 10, such as temperature, pressure, moisture, luminosity, vibrations, gas compound concentration, volatile organic compounds, toxins, bacteria, fungi, acidity, and/or sound level, among many others.

According to the teachings of the invention, the device 1 may include a computing unit (not illustrated for simplicity of the figure), or even more than one, having one or more processors and at least one memory, and which is operatively connected to the 3D sensor 20 through a communication module thereof, either via a wired or a wireless technology. That is, the computing unit is arranged together with the 3D sensor 20 within the same enclosure 19. The computing unit is adapted and configured to run an algorithm (or more than one) to implement the proposed method and so compute the amount of content 11 stored within the container 10. Alternatively, and in this case forming a system and not a single device, the computing unit may be remote to the device 1, i.e. both the 3D sensor 20 and the computing unit form part of different devices. In this latter case, the computing unit may be located remote to the container 10, and take the form of a computer device such as a PC, a Tablet or a Smartphone, among many other computer devices.

The communication module(s) (not illustrated in the figures) of the device 1 besides allowing the communication with the computing unit is also configured to communicate with other devices (located at remote containers) and/or with a remote system such as a cloud service or a mobile/computer application via a gateway or edge router (see FIG. 5), preferably via wireless technology.

The algorithm(s) to perform said computation of the amount of content 11 stored within the container 10 and so implementing the proposed method, firstly computes a 3D surface model based on a given reference system RS by processing the acquired depth map DM and by using the position P, the orientation O and the field of view FOV of the 3D sensor 20. Secondly, a 3D level model is computed by removing from the computed 3D surface model the points corresponding to the interior walls of the container 10, using a 3D function that searches the intersection or matching points between the 3D surface model and the 3D shape model of the container S, and filling in the missing points corresponding to the content 11 that falls out of the field of view FOV of the 3D sensor 20. Optionally, differences in reflectivity and color can be used to differentiate the content 11 from the interior walls of the container 10.

Besides, the algorithm(s) may further compute different representations indicative of the content using the computed 3D level model and the 3D shape model S of the container 10. In an embodiment, a liquid level model can be computed providing a scalar value representing the equivalent level if the surface of the content 11 adopted a horizontal plane shape. According to other embodiments, a 3D content model and/or a 3D volume model providing a 3D representation of the total content 11 stored inside the container 10 and a scalar value representing the equivalent volume of the content 11, can be also computed.

According to an embodiment, the mass corresponding to the content 11 is computed using the volume model and a given density of the content 11. Alternatively, the density corresponding to the content 11 can be computed using the volume model and a given mass of the content 11. The computed mass or the computed density can be automatically adjusted each time an increment in volume of the content 11 is detected (i.e. each time new content is added to the container 10) as the pondered mean of the density or as a pondered mean of the mass of the different contents stored in the container 10.

Figure 7:
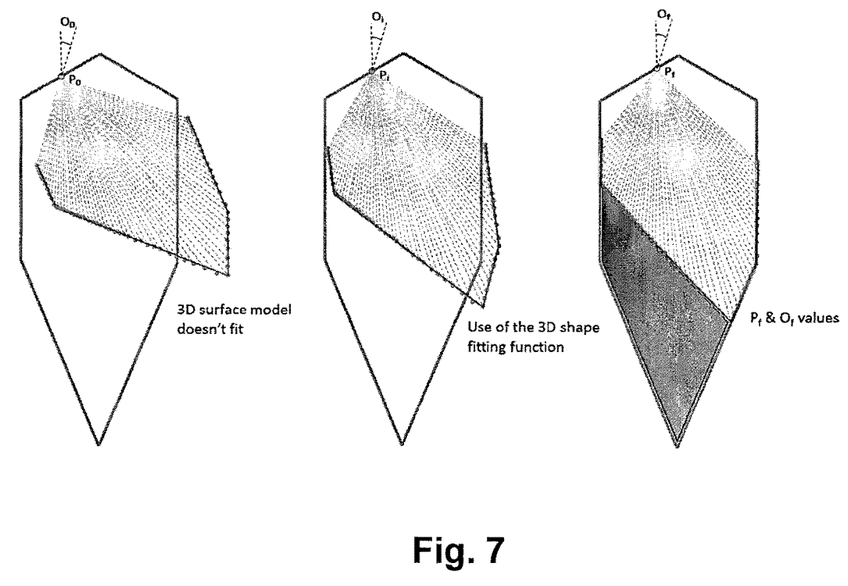
FIG. 7 illustrates in a schematic way the referred fitting function for automatically adjusting the position and orientation of the 3D sensor

Small errors in the position P and orientation O of the 3D sensor 20 may have great impact in accuracy. Therefore, and because this parameters must be obtained after installation of the 3D sensor 20 and they are not easy to measure, the method, according to an embodiment, automatically obtain or adjusts them using a 3D shape fitting function. The fitting function (see FIG. 7) iterates trying different combinations of position P and orientation O parameters until the 3D surface model fits within the shape S of the container 10. The position and orientation values of the final parameters ($P_f$ & $O_f$) are registered as the default P & O parameters. These adjusted parameters will then be used when the 3D surface model doesn't include information of the container's walls due to insufficient field of view FOV.

The algorithm(s) can compute different 3D surface models at different periods of time. Then these different 3D surface models can be used together with the 3D shape model S of the container 10 to detect adherences stacked to the interior walls of the container 10.

The 3D sensor 20 may also include, according to an embodiment, an optical auto-zoom to modify the field of view FOV of the 3D sensor 20. This feature can be used by the algorithm(s) to improve the accuracy of the measure(s), achieving the optimum observed surface and resolution of the measured content surface at each content level.

According to alternative embodiments, not illustrated, and particularly when the farm silo is of big dimensions so that a single 3D sensor is not enough for covering all the surface of the content 11 and so not allowing a correct assessment of the content 11, two or more 3D sensors 20 can be used (in this case, each 3D sensor has its own field of view FOV, covering between them the whole surface area of the content 11). In this case, the algorithm(s) to perform the computation of the amount of content 11 stored within the container 10 and so implementing the proposed method, will use the depth map DM acquired by each 3D sensor 20 to compute the cited 3D surface model and 3D level model. Preferably, each 3D sensor 20 used is comprised in a device 1 (i.e. each device 1 only comprises one 3D sensor 20). However, it is also possible to have two (or more) 3D sensors 20 comprised in a single device 1.

The scope of the present invention is defined in the following set of claims.

What is claimed is:

1. A method for assessing the amount of content stored within a container, the container including a farm silo, having a given shape (S) defined by a 3D model on a given reference system and storing a given amount of content, said method comprising:
   attaching, on a top part of the container, a 3D sensor, said 3D sensor being a high-resolution and wide field-of-view 3D camera and being arranged in a position and with an orientation such that a field of view of the 3D sensor is oriented towards said content;
   acquiring, by the 3D sensor, a depth map of a given resolution, said depth map including the whole or a portion of a surface of the content, and that may also include the whole or a portion of an interior walls of the container; and
   computing, by a computing unit operatively connected to the 3D sensor:
     a 3D surface model based on said given reference system by processing said acquired depth map and using said position, orientation and field of view;
     a fitting function that fits the computed 3D surface model to the shape of the container to automatically adjust said position and orientation; and
     a 3D level model by removing from the computed 3D surface model the points corresponding to the interior walls of the container, using a 3D function that searches the intersection or matching between the 3D surface model and the shape of the container, and filling in the missing points corresponding to the content that falls out of the field of view of the 3D sensor; and
     using the computed 3D level model to compute the amount of content stored within the container.

2. The method of claim 1, further comprising computing a liquid level model corresponding to the 3D level model using the 3D level model and the shape of the container, the computed liquid level providing a scalar value representing the equivalent level if the surface of the content adopted a horizontal plane shape.

3. The method of claim 1, further comprising computing a 3D content model corresponding to a 3D representation of the content stored in said container using the 3D level model and the shape of the container.

4. The method of claim 1, further comprising computing a volume corresponding to the content stored in said container using the 3D level model and the shape of the container.

5. The method of claim 4, further comprising:
   computing a mass corresponding to the content using said computed volume and a given density of the content; or
   computing a density corresponding to the content using said computed volume and a given mass of the content, wherein said given density of the content to compute the mass being a pondered mean of the density of different contents stored in the container or said given mass of the content to compute the density being a pondered mean of the mass of different contents stored in the container.

6. The method of claim 1, wherein said 3D model of the container's shape being obtained by a parametric function using a given type of container with dimensions defining his size and proportions.

7. The method of claim 6, further comprising computing different 3D surface models at different periods of time and using one or more of said computed different 3D surface models and a 3D shape fitting function to automatically adjust the 3D model of the container's shape.

8. The method of claim 1, wherein:
   one, two or three of a coordinates (x,y,z) of the position of the 3D sensor being prefixed during the attachment of the 3D sensor to the top part of the container using some reference points of the container; and
   one, two or three of angles ($\alpha$, $\beta$, $\gamma$) of the orientation of the 3D sensor being:
   prefixed during the attachment of the 3D sensor to the top part of the container using visible marks on the 3D sensor and pointing the marks to some reference points of the container; or
   obtained by using a sensor comprising one of an inclinometer, an accelerometer, a gyroscope, a magnetometer or combinations thereof attached to the 3D sensor.

9. The method of claim 1, wherein the 3D level model being further computed using differences in reflectivity or color to differentiate the content from the interior walls of the container.

10. The method of claim 1, further comprising computing different 3D surface models at different periods of time and using one or more of said computed different 3D surface models and the shape of the container to compute adherences of the content stacked to the interior walls of the container.

11. The method of claim 1, further comprising computing adherences of the content stacked to the interior walls of the container using differences in reflectivity or color to differentiate the content from the interior walls of the container.

12. The method of claim 1, further comprising:
   attaching, on the top part of the container, at least one further 3D sensor, in a position and with an orientation such that a field of view of the further 3D sensor is oriented towards the content, wherein the field of view of the further 3D sensor being complementary to the field of view of the 3D sensor so that a total area observed is greater that the area observed by each individual 3D sensor;
   acquiring, by the further 3D sensor, a further depth map of a given resolution, said further depth map including the whole or a portion of a surface of the content, and that may also include the whole or a portion of an interior walls of the container; and
   computing, by the computing unit operatively connected to the 3D sensor and to the further 3D sensor:
     a 3D surface model based on the given reference system by processing all the acquired depth maps and using the given position, orientation and field of view of each 3D sensor and by using a 3D union and matching function that joints the non-coincident points and matches the coincident points; and
     a 3D level model by removing from the computed 3D surface model the points corresponding to the interior walls of the container, using a 3D function that searches the intersection or matching between the 3D surface model and the shape of the container, and filling in the missing points corresponding to the content that falls out of the field of view of the attached 3D sensors.

13. A system for assessing the amount of content stored within a container, comprising:
  a container including a farm silo, having a given shape defined by a 3D model on a given reference system and storing a given amount of content;
  at least one device comprising a 3D sensor, said 3D sensor being a high-resolution and wide field-of-view 3D camera including a TOF sensor and being arranged and configured to be attached on a top part of the container in a position and with an orientation such that a field of view of the 3D sensor is oriented towards said content; and
  at least one computing unit operatively connected to the 3D sensor, the computing unit including one or more processors to compute:
  a 3D surface model based on said given reference system by processing said acquired depth map and using said given position, orientation and field of view;
  a fitting function that fits the computed 3D surface model to the shape of the container to automatically adjust said position and orientation; and
  a 3D level model by removing from the computed 3D surface model the points corresponding to the interior walls of the container, using a 3D function that searches the intersection or matching between the 3D surface model and the shape of the container, and filling in the missing points corresponding to the content that falls out of the field of view of the 3D sensor.

14. The system of claim 13, wherein said attachment of the 3D sensor includes a pivoting element with a fixation mechanism so that said field of view of the 3D sensor is orientable and fixable towards the content of the container or said attachment of the 3D sensor includes a pivoting element for a gravity auto-alignment of the 3D sensor so that said field of view of the 3D sensor, opposite to said pivoting element, is facing a vertical direction towards the inside of the container.

15. The system of claim 13, wherein the device further includes a one, two or three axis measuring sensor, including an inclinometer, an accelerometer, a gyroscope, a magnetometer or combinations thereof, configured to provide information about said orientation and wherein the 3D sensor is attached to the top part of the container by a ring-shaped member externally attachable.

16. The system of claim 15, wherein the device further comprises one or more batteries for power supply the device and at least one of an energy harvesting device, including a photovoltaic panel incorporated in a slopped support plane attached to said ring-shaped member, or a thermoelectric generator that leverages a temperature differential between the interior of the container and the outside.

17. The system of claim 13, wherein the device further includes a set of sensors configured to detect storage conditions of the container and/or different physical and/or biological conditions of the content stored within the container, including temperature, pressure, moisture, luminosity, vibrations and/or sound level, as well as volatile components, including $CO_2$ and/or $NH_3$, produced by fungi and bacteria metabolism presents in the content.

18. The system of claim 13, wherein:
  the 3D sensor includes an enclosure comprising means for dust, condensation, microbial, and/or insects immunity using passive methods, including anti-static, hydrophobic, anti-microbial, insect-repellent materials or coatings, and/or active methods, including vibration at a frequency or pattern of frequencies, windscreen wipers or heating; and
  the 3D sensor is an optical sensor that further includes an optical auto-zoom to modify the field of view thereof in order to adapt to a current content level, said optical auto-zoom being connected to the computing unit.

19. The system of claim 15, wherein the device further comprises a presence detector adapted to detect the presence of an element placed in the ring-shaped member, the presence detector operating to activate or deactivate at least one battery of the device depending on said presence detection.

20. The system of claim 13, wherein the device further comprises one or more communication modules configured to communicate with a remote system, including a cloud service or a mobile/computer application, via a wireless communication network using Internet communication protocols.

* * * * *